(12) United States Patent
Merkel (10) Patent No.: US 6,864,198 B2
(45) Date of Patent: Mar. 8, 2005

(54) CORDIERITE CERAMIC BODY AND METHOD

(75) Inventor: Gregory A. Merkel, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 99 days.

(21) Appl. No.: 10/354,326

(22) Filed: Jan. 30, 2003

(65) Prior Publication Data

US 2004/0148916 A1 Aug. 5, 2004

(51) Int. Cl.$^7$ .............................................. C04B 35/195
(52) U.S. Cl. ........................ 501/80; 501/81; 501/119; 501/153; 501/154
(58) Field of Search .................... 501/80, 81, 153, 501/154, 118, 119

(56) References Cited

U.S. PATENT DOCUMENTS

| | | | |
|---|---|---|---|
| 3,950,175 A | | 4/1976 | Lachman et al. |
| 4,280,845 A | | 7/1981 | Matsuhisa et al. |
| 4,632,683 A | | 12/1986 | Fukutani et al. |
| 4,849,725 A | * | 7/1989 | Nakano et al. ............ 335/8 |
| 5,258,150 A | | 11/1993 | Merkel et al. |
| 5,545,243 A | | 8/1996 | Kotani et al. |
| 5,773,103 A | * | 6/1998 | Ciora et al. ............ 428/34.6 |
| 6,004,501 A | * | 12/1999 | Cornelius et al. ......... 264/631 |
| 6,087,281 A | | 7/2000 | Merkel |
| 6,214,437 B1 | | 4/2001 | Beall et al. |
| 6,432,856 B1 | | 8/2002 | Beall et al. |
| 2003/0007905 A1 | * | 1/2003 | Tanaka et al. ............ 422/180 |

FOREIGN PATENT DOCUMENTS

| | | |
|---|---|---|
| EP | 0 753 490 | 1/2002 |
| EP | 1 184 066 | 6/2002 |
| JP | 2001-340718 | 12/2001 |
| WO | 02/41972 | 5/2002 |

OTHER PUBLICATIONS

Hashimoto et al., "SiC and Cordierite Diesel Particulate Filters Designed for Low Pressure Drop and Catalyzed, Uncatalyzed Systems", SAE Technical Paper 2002-01-0322, p. 1-14.
Beall et al., U.S. Appl. No. 09/867,321, filed May 29, 2001, "Cordierite Body".

* cited by examiner

*Primary Examiner*—David Sample
(74) *Attorney, Agent, or Firm*—Anca C. Gheorghiu; Kees van der Sterre (57) ABSTRACT

A cordierite ceramic body having (i) a pore size distribution and a porosity which satisfy the relationship $10.2474/[(d_{50})^2(\text{pore fraction})] + 0.0366183(d_{90}) - 0.00040119(d_{90})^2 + 0.468815(1/\text{pore fraction})^2 + 0.0297715(d_{50}) + 1.61639(d_{50} - d_{10})/d_{50} \leq 3.65$, and (ii) a CTE (25°–800° C.) of $\leq 15 \times 10^{-7}$/° C., wherein the cordierite ceramic body is produced from a moldable mixture comprising cordierite-forming raw materials including (a) a fine talc having a median particle diameter, as measured by laser diffraction, of less than 10 micrometers, and a B.E.T. specific surface area of greater than 5 m$^2$/g, and (b) a pore former. The cordierite ceramic body is suitable in the fabrication of cellular, wall-flow diesel particulate filters having a low pressure drop, high filtration efficiency and improved strength.

14 Claims, 2 Drawing Sheets

CORDIERITE CERAMIC BODY AND METHOD

BACKGROUND OF INVENTION

The present invention relates to cordierite bodies, and especially the kind with properties suitable for use in exhaust after-treatment applications, particularly diesel exhaust filtration.

Cordierite ceramic bodies, especially such formed as honeycomb multicellular structures, find employment in a number of high temperature applications such as catalytic converters, NOx adsorbers, electrically heated catalysts, molten metal filters, regenerator cores, chemical process substrates, catalysts for hydrodesulfurization, hydrocracking, or hydrotreating, and filters such as diesel particular filters.

In diesel exhaust filtration, cordierite, being a low-cost material, in combination with offering a low coefficient of thermal expansion (CTE), has been the material of choice. Porous cordierite ceramic filters of the wall-flow type have been utilized for the removal of particles in the exhaust stream from some diesel engines since the early 1980s. A diesel particulate filter (DPF) ideally combines low CTE (for thermal shock resistance), low pressure drop (for engine efficiency), high filtration efficiency (for removal of most particles from the exhaust stream), high strength (to survive handling, canning, and vibration in use), and low cost. However, the combination of high filtration efficiency, high strength, and very low pressure drop has proven elusive with cordierite DPFs.

Typical commercially available cordierite DPFs have about 48% porosity, a median pore diameter of about 12 $\mu$m, and a broad pore size distribution. While such DPFs have adequate filtration efficiency and strength, their pressure drop when loaded with carbon soot is high. This occurs as a rapid increase in pressure drop during the loading of the first gram/liter of carbon soot. The initial soot is believed to enter into the pores of the ceramic and reduce the permeability through the filter walls. Subsequent to the first gram/liter of soot, the increase in pressure drop with soot loading becomes more gradual.

Reduction in soot-loaded pressure drop has recently been reported for higher-porosity (59%) filters with a larger median pore size (25 $\mu$m) (SAE Technical Paper 2002-01-0322, "SiC and Cordierite Diesel Particulate Filters Designed for Low Pressure Drop and Catalyzed, Uncatalyzed Systems," Hashimoto et al.). However, strengths for filters with such high porosity and coarse pore size are so low that especially careful handling is required. Furthermore, these filters still exhibit an undesirably high rate of increase in pressure drop with the addition of the first gram/liter of soot, although not as severe as for previously available lower-porosity filters with finer pore size. Work by the present investigator has shown that further reduction in pressure drop is possible when median pore size is increased beyond 25 $\mu$m; however, such cordierite ceramic bodies have a low filtration efficiency.

It would be considered an advancement in the art to obtain cordierite ceramic bodies that combine high filtration efficiency, along with low pressure drop and improved strength. The present invention provides such bodies and method of making them.

SUMMARY OF INVENTION

In accordance with the present invention there is provided a cordierite ceramic body having (i) a pore size distribution and a porosity which satisfy the relationship $10.2474/[(d_{50})^2(\text{pore fraction})]+0.0366183(d_{90})-0.00040119(d_{90})^2+0.46815(1/\text{pore fraction})^2+0.0297715(d_{50})+1.61639(d_{50}-d_{10})/d_{50} \leq 3.65$, and (ii) a CTE (25°–800° C.) of $\leq 15 \times 10^{-7}/°$ C., preferably $\leq 10 \times 10^{-7}/°$ C., and more preferably $\leq 7 \times 10^{-7}/°$ C., wherein the cordierite ceramic body is produced from a moldable mixture comprising cordierite-forming raw materials including (a) a fine talc having a median particle diameter, as measured by laser diffraction, of less than 10 micrometers, preferably less than 7 micrometers, and more preferably less than 5 micrometers, and a B.E.T. specific surface area of greater than 5 $m^2/g$, preferably greater than 8 $m^2/g$, and (b) a pore former.

The inventive ceramic bodies are suitable in high temperature applications, and particularly as diesel exhaust filtration devices exhibiting low pressure drops, high filtration efficiency and good strength. In a preferred embodiment there is provided a DPF comprising a honeycomb body, and having an inlet end and an outlet end, a multiplicity of cells extending from the inlet end to the outlet end, the cells having porous walls, wherein part of the total number of cells at the inlet end are plugged along a portion of their lengths, and the remaining part of the cells that are open at the inlet end are plugged at the outlet end along a portion of their lengths, so that an engine exhaust stream passing through the cells of the honeycomb from the inlet end to the outlet end flows into the open cells, then through the cells walls, and out of the structure through the open cells at the outlet end.

In another aspect of the invention there is also provided a method of making a cordierite article, comprising (a) forming a batch of raw materials including alumina, silica, a fine talc having a median particle diameter, as measure by laser diffraction, of less than 10 micrometers, and a B.E.T. specific surface area of greater than 5 $m^2/g$, a pore former, and optionally clay; (b) plasticizing and shaping the mixture; and, (c) firing to a temperature and for a time sufficient to convert the raw materials to crystalline cordierite.

DETAILED DESCRIPTION OF INVENTION

In accordance with the practice of the present invention there is provided a ceramic body composed predominately of a cordierite having a composition close to that of $Mg_2Al_4Si_5O_{18}$. Such ceramic bodies are particularly well suited for filtration applications, such as diesel exhaust filters or DPFs.

Conventionally, cordierite DPFs are formed by reaction of raw materials that include a coarse talc, a coarse silica, and a coarse pore former, in combination with one or more of a kaolin, alumina, and aluminum hydroxide. During firing, the dehydration products of the former coarse talc particles undergo a melting reaction with partially reacted cordierite at about 1340° C. to form a liquid that fills in the surrounding fine porosity and leaves behind large, relic pores in the spaces formerly occupied by the talc particles. The resulting pore microstructure after firing is completed, consists of large pores that are not well connected to one another. This has been found to result in clogging of the pores by soot during filtration, causing an undesirable rapid increase in pressure drop with soot loading.

The present invention seeks to minimize the transient melting reactions at high temperature by utilizing a talc having a finer particle size than that which has been previously practiced. In this way, a pore microstructure is developed in the fired body that is characterized by a finer median pore size, a narrower pore size distribution, and a greater connectivity of the pores. It has been found that such a microstructure results in a much lower rate of increase in pressure drop with soot loading, while maintaining high filtration efficiency.

Accordingly, the porosity, median pore diameter, and pore size distribution of the cordierite ceramic bodies of the present invention satisfy the relationship $P_f \leq 3.65$, where $P_f$, the porosity factor, is defined as $10.2474/[(d_{50})^2(\text{pore fraction})]+0.0366183(d_{90})-0.00040119(d_{90})^2+0.468815(1/\text{pore fraction})^2+0.0297715(d_{50})+1.61639(d_{50}-d_{10})/d_{50}$. Preferably $P_f \leq 3.3$, and more preferably $P_f \leq 3.0$. The term "pore fraction" is the percent by volume of porosity, as measured by mercury porosimetry, divided by 100. The parameters $d_{10}$, $d_{50}$ and $d_{90}$ relate to the pore size distribution. The quantity $d_{50}$ is the median pore size based upon pore volume, and is measured in micrometers; thus, $d_{50}$ is the pore diameter at which 50% of the open porosity of the ceramic has been intruded by mercury. The quantity $d_{90}$ is the pore diameter at which 90% of the pore volume is comprised of pores whose diameters are smaller than the value of $d_{90}$; thus, $d_{90}$ is equal to the pore diameter at which 10% by volume of the open porosity of the ceramic has been intruded by mercury. The quantity $d_{10}$ is the pore diameter at which 10% of the pore volume is comprised of pores whose diameters are smaller than the value of $d_{10}$; thus, $d_{10}$ is equal to the pore diameter at which 90% by volume of the open porosity of the ceramic has been intruded by mercury. The values of $d_{10}$ and $d_{90}$ are also in units of micrometers. The quantity $(d_{50}-d_{10})/d_{50}$ describes the width of the distribution of pore sizes finer than the median pore size, $d_{50}$.

The porosity of the inventive body is at least 43%, and is preferably at least 50%, and is more preferably at least 55%. To maintain a combination of good strength and low pressure drop, the porosity is preferably no greater than 75% and more preferably no greater than 65%. The median pore diameter, $d_{50}$, is $\geq 3$ μm and is <25 μm; preferably $\leq 20$ μm, and more preferably $\leq 12$ μm; and, it is also preferably $\geq 5$ μm and more preferably $\geq 7$ μm. The parameter $d_{90}$, is $\leq 70$ μm, preferably $\leq 50$ μm, and more preferably $\leq 30$ μm. The parameter $(d_{50}-d_{10})/d_{50}$, is not greater than 0.70, preferably less than 0.60, more preferably less than 0.55, still more preferably less than 0.50, and most preferably less than 0.45.

Another advantage of the inventive bodies is a low thermal expansion resulting in excellent thermal shock resistance (TSR). TSR is inversely proportional to the coefficient of thermal expansion (CTE). That is, honeycomb structures with low thermal expansion have good thermal shock resistance and can survive the wide temperature fluctuations that are encountered in application. Accordingly, the coefficient of thermal expansion from 22° to 800° C., as measured by dilatometry, is $\leq 15\times10^{-7}$ °C.$^{-1}$, preferably $\leq 10\times10^{-7}$ °C.$^{-1}$, and more preferably $\leq 7\times10^{-7}$ °C.$^{-1}$.

The CTE of the inventive body is lower than the mean lattice CTE of cordierite, which is about $15\times10^{-7}$/° C. to $18\times10^{-7}$/° C., due to microcracking in the structure. Optionally, the cordierite body may also exhibit a preferred, non-random crystallographic orientation of the cordierite crystallites that comprise the body. When the body has a tubular, cellular, or honeycomb type geometry, it is preferred that the cordierite crystals are preferentially oriented with their crystallographic c-axes lying within a plane that is parallel to the formed surface of the walls of the body. This preferred orientation of the crystallites contributes to a reduction in the thermal expansion of the body as measured along a direction parallel to the surface of the walls because cordierite exhibits a negative CTE in the direction of the crystal c-axis.

The cordierite bodies of the present invention can have any shape or geometry suitable for a particular application. In high temperature filtration applications, such as diesel particulate filtration, for which the inventive bodies are especially suited, it is preferred the bodies to have a multi-cellular structure, such as a honeycomb monolith.

The honeycomb structure has an inlet and outlet end or face, and a multiplicity of cells extending from the inlet end to the outlet end, the cells having porous walls. The inventive filters have cellular densities from 70 cells/in$^2$ (10.9 cells/cm$^2$) to 400 cells/in$^2$ (62 cells/cm$^2$). A portion of the cells at the inlet end or face are plugged with a paste having same or similar composition to that of the filter, as described in U.S. Pat. No. 4,329,162 which is herein incorporated by reference. The plugging is only at the ends of the cells which is typically to a depth of about 5 to 20 mm, although this can vary. A portion of the cells on the outlet end but not corresponding to those on the inlet end are plugged. Therefore, each cell is plugged only at one end. The preferred arrangement is to have every other cell on a given face plugged as in a checkered pattern.

This plugging configuration allows for more intimate contact between the exhaust stream and the porous wall of the substrate. The exhaust stream flows into the substrate through the open cells at the inlet end, then through the porous cell walls, and out of the structure through the open cells at the outlet end. Filters of the type herein described are known as "wall flow" filters since the flow paths resulting from alternate channel plugging require the exhaust being treated to flow through the porous ceramic cell walls prior to exiting the filter.

Cordierite diesel particulate filters having lower pressure drop, in combination with high filtration efficiency, as well as improved strength have been obtained relative to cordierite filters of the prior art. The pressure drop across the filter is a function of the accumulation of the carbonaceous soot on the walls of the diesel particulate filter. As the amount of soot accumulated increases, it creates a progressive increase in the resistance to flow of the exhaust gas through the walls of the filter and carbon soot layer. This resistance to flow is manifested as a pressure drop that can be measured across the length of the filter, and results in an increased back pressure against the engine.

The pressure drop increase at a given loading of soot (in grams/liter) depends upon the geometry of the filter, the permeability of the ceramic wall, and the permeability of the accumulated soot layer. Geometric factors that influence pressure drop include the length and diameter of the filter, the depth of the plugs at the ends of the filter, the number of cells per unit area, and the thickness of the walls. The permeability of the clean ceramic wall, prior to soot loading, is controlled by the porosity, pore size distribution, and pore connectivity. Furthermore, during the initial stages of soot loading, some of the soot enters into the pores on the surface of the ceramic wall. This reduces the permeability of the wall compared to the permeability of the clean wall prior to the deposition of any soot. This reduction in permeability increases the pressure drop through the filter. During these initial stages of soot loading, the extent to which the pressure drop is increased at a given soot loading depends upon the permeability of the soot that resides within the pores of the filter wall. The permeability of the soot within the pores of the ceramic wall, in turn, depends upon how densely the soot particles are packed within the pore. Soot particles that are packed more densely will result in a lower permeability of gas through the soot within the pores, and, thus, a lower permeability through the wall within which the soot resides. It has been found that the density of the packing of the soot in the wall and, thus, the permeability of the wall containing the soot, are also influenced by the porosity, pore size distribution and pore connectivity of the ceramic comprising the wall. Thus, the porosity, pore size distribution and pore connectivity influence the pressure drop of the clean and soot-loaded filter, which, in turn, affects the fuel economy and efficiency of the diesel engine.

Once the surface pores in the wall of the filter have been filled with soot, additional soot accumulates primarily on the surface of the wall, forming a layer of soot that progressively thickens with further deposition of soot. The low permeability of this soot layer results in a further increase in pressure drop.

In addition to lower pressure drop, other advantages of the present invention include high filtration efficiencies, and improved strength relative to higher porosity filtering structures. This is due to the restrictions on porosity, median pore diameter, and pore size distribution described above in relation to the porosity factor, $P_f$, described herein above. Accordingly, the inventive filters have filtration efficiencies, based upon the number of particles, of $\geq 95\%$, preferably $\geq 98\%$, and exhibit a four-point modulus of rupture, as measured on a honeycomb bar of rectangular cross section having approximately 170 to 200 cells/inch$^2$ and a wall thickness of approximately 0.011 to 0.012 inches, such that the channels of the honeycomb are oriented parallel to the length of the bar, of at least 150 psi, preferably at least 200 psi, and more preferably at least 250 psi.

The invention also relates to a method for fabricating the inventive cordierite bodies. Up to now it was thought that to get a narrow pore size distribution which allows for better pore connectivity at a given amount of porosity, a mixture of cordierite-producing raw materials absent talc and clay was necessary. This is described in co-pending, co-assigned application entitled "Magnesium Aluminum Silicate Structures for DPF Applications" by Beall et al., having Ser. No. 60/392,699. It has now been discovered, that similar or better pore size distribution and pore connectivity properties can be achieved from a mixture of cordierite-forming raw materials which include a fine talc, and optionally kaolin.

The use of fine talc enables firing at a lower temperature relative to raw material combinations that are based upon magnesium oxide as a magnesium source. Further, fine talc enables complete reaction of raw materials to form cordierite at 1405° C. instead of the 1430° C. required for bodies made with MgO, Al$_2$O$_3$, and SiO$_2$ as raw materials. Because cordierite melts at about 1455° C., this may allow greater latitude in the temperature gradients within the hot zone of the furnace during manufacture. The term "fine talc" as used presently means talc having a median particle diameter, as measured by laser diffraction, of less than 10 micrometers, and a B.E.T. specific surface area of greater than 5 m$^2$/g.

Preferably the fine talc has a median particle size of less than 7 micrometers, and more preferably less than 5 micrometers. The B.E.T. specific surface area is preferably greater than 8 m$^2$/g.

In addition to the fine talc, other raw materials include an aluminum oxide (Al$_2$O$_3$)-forming source, and silica. The Al$_2$O$_3$-forming source can be, for example, aluminum oxide, aluminum hydroxide, hydrated alumina, alpha alumina, a transition alumina such as gamma-alumina or rho-alumina, boehmite, aluminum nitrate, aluminum carbonate or combinations of these. It is preferred that the amount of aluminum hydroxide Al(OH)$_3$ comprise at least 10% by weight of the raw material mixture. When the raw material mixture contains more than approximately 15 percent by weight of an Al$_2$O$_3$-forming source having a median particle diameter less than 1.0 μm, then the ratio of the weight percent addition of pore former divided by the specific gravity of the pore former particles must be at least 13. For example, this ratio is equivalent to approximately 30 weight percent addition of graphite (specific gravity=2.26) or 19 weight percent addition of starch (specific gravity=1.45) or 12 weight percent polyethylene (specific gravity=0.92).

The silica is supplied by a silica-forming source, including quartz, cristobalite, non-crystalline silica such as fused silica or a sol-gel silica, zeolite, colloidal silica, diatomaceous silica and mixtures thereof. The silica source has a median particle diameter of at least 1 micrometers, preferably at least 3 micrometers, and more preferably at least 10 micrometers.

Optionally, the mixture may contain kaolin. The median particle diameter is greater than approximately 0.5 micrometers and less than approximately 15 micrometers, preferably less than approximately 5 micrometers.

The raw material batch further includes a pore former that is preferably a particulate material selected from the group consisting of graphite, cellulose, starch, synthetic polymers such as polyacrylates and polyethylenes, and combinations thereof. The weight percent of the pore former is computed as: 100×[weight of pore former/weight of cordierite-producing raw materials]. Graphite and potato starch are preferred pore formers. The median particle diameter of the pore former is at least 3 micrometers and not more than 140 micrometers, preferably at least 5 micrometers and not more than 80 micrometers, and more preferably at least 10 micrometers and not more than 50 micrometers. When the silica source has a median particle diameter greater than 20 micrometers, the pore former must have a median particle diameter of not more than 100 micrometers.

In a preferred embodiment the batch of raw materials includes 15 to 17 weight percent aluminum hydroxide as an alumina-forming source, 13 to 23 weight percent aluminum oxide as an alumina-forming source, 11 to 23 weight percent quartz as the silica, 39 to 42 weight percent fine talc having a median particle diameter, as measure by laser diffraction, of less than 10 micrometers, and a B.E.T. specific surface area of greater than 5 m$^2$/g, and 20 to 40 percent graphite as the pore former having a median particle diameter of between 15 and 50 micrometers, and optionally 8 to 17 percent kaolin. It is understood that the actual weights of the cordierite-producing raw materials for a given mixture are chosen so as to yield a body that is predominately composed of the cordierite phase after firing.

The raw material mixture is intimately blended with a vehicle and forming aids which impart plastic formability and green strength to the raw materials when they are shaped into a body. Forming may be done by, for example, molding or extrusion. When forming is done by extrusion, most typically methyl cellulose serves as a binder, and sodium stearate serves as a lubricant. The relative amounts of forming aids can vary depending on factors such as the nature and amounts of raw materials used, etc. For example, the typical amounts of forming aids are about 2%. to about 10% by weight of methyl cellulose, and preferably about 3% to about 6% by weight, and about 0.5% to about 1% by weight sodium stearate, and preferably about 0.6% by weight. The raw materials and the forming aids are mixed together in dry form and then mixed with water as the vehicle. The amount of water can vary from one batch of materials to another and therefore is determined by pre-testing the particular batch for extrudability.

The resulting plastic mixture is then formed into a green body, preferably a honeycomb structure. Bodies which have not been sintered are referred to as green bodies. Extrusion techniques are well know in the art. The green bodies are dried and then fired at a sufficient temperature and for a sufficient time to form the final product structure. The firing is preferably done by heating to a maximum temperature of about 1405 to 1415° C. over a time period of 50 to 300 hours, and held there for at least 5 hours, preferably at least 15 hours. The compositions of the present invention result in formation of a ceramic structure which is predominately of a phase approximating the stoichiometry $Mg_2Al_4Si_5O_{18}$.

If a diesel particulate filter is formed from the resulting honeycomb structures, a plugging operation follows. A first portion of the cells at the inlet end or face are plugged at the ends to a depth of about 6 to 12 mm, and a second portion of cells at the outlet end or face different from the inlet end cells are additionally plugged so that each cell of the structure is plugged only at one end. The preferred arrangement is to have every other cell on a given face plugged in a checkered pattern.

To more fully illustrate the invention, the following non-limiting examples are present below. All parts, portions and percentages are on a weight basis unless otherwise stated.

EXAMPLES

Inventive and comparative examples were prepared by mixing together selected raw materials from Table 1 in the proportions listed for the examples in Tables 2, 3, 4 and 5. 100 parts by weight of the dry ingredients (oxides plus pore formers) were mixed with about 4 to 6 parts by weight methyl cellulose and 1 part by weight sodium stearate. The contents were then plasticized with about 25 to 40 parts by weight deionized water and extruded into honeycomb having a nominal cell density of 200 cells/inch$^2$ and a wall thickness of 0.012 inches. The honeycombs were dried and subsequently fired to a temperature of 1405 to 1415° C., held at that temperature for 11 or 25 hours, respectively, and then cooled to room temperature.

Comparative (non-inventive) examples and properties measured thereon are provided in Table 2. Inventive examples and respective properties are provided in Tables 3 to 5. Pore volume, % porosity, and pore size distribution were measured by mercury porosimetry. Coefficient of thermal expansion along the axial direction (parallel to the length of the channels) was measured by dilatometry. Some parts that were about 5 cm diameter by 16 cm long were plugged at the ends of alternate channels on the opposite faces in a checkerboard pattern such that a channel that was plugged at one end was open at the other end, thereby forming a wall-flow filter. Channels adjacent to the outer skin of the filter that did not have full-sized, square openings were plugged at both ends, forming a so-called "plug ring." Modulus of rupture was measured by the four-point method on bars that were approximately 2.5, cm by 1.2 cm by 16 cm with the channels running parallel to the length of the bar, and is provided in units of pounds per square inch (psi). Pressure drop across the length of the clean filter was measured at ambient temperature at air flow rates of 11.25 and 26.25 standard cubic feet per minute (scfm).

The filters were then progressively loaded with artificial high surface area carbon soot at loadings from about 0.5 grams/liter to about 5 grams/liter, and the pressure drops measured at 11.25 and 26.25 scfm for each soot loading. The weight of soot in the filter was determined by weighing the filter before and after loading with soot. The effective volume of the filter, used to compute the soot loading in units of grams/liter, was computed from the effective frontal area of the filter multiplied by the effective length of the filter. The effective frontal area was computed from the diameter of the face of the filter, excluding the plug ring around the perimeter of the filter. The effective length of the filter was computed as the outer length of the filter minus the depth of the plugs at the inlet face and minus the depth of the plugs at the outlet face. The values of pressure drop at 1 and 5 g/l soot loading were derived by interpolation or extrapolation of the original data. Inventive examples 1, 4 and 7 are most preferred.

Figure 1:
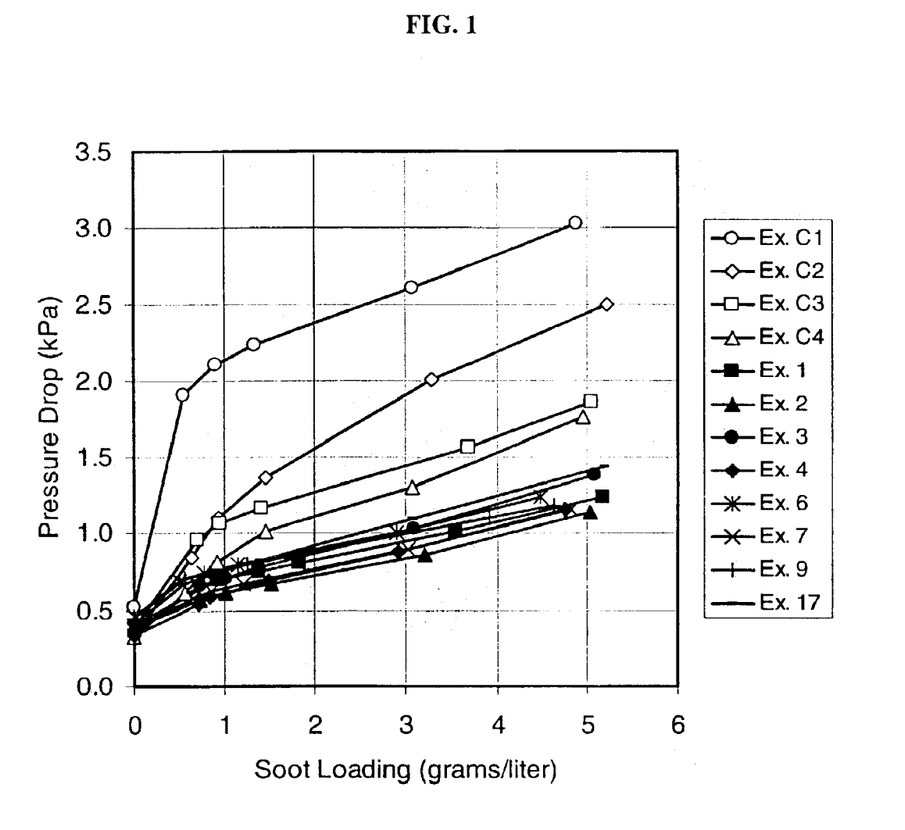
FIG. 1 illustrates the pressure drop through the filter in kPa (kiloPascals) as a function of soot loading in grams/liter for a set of comparative and inventive examples according to the present invention. Pressure drop values were obtained for an air flow rate of 11.25 scfm (standard cubic feet per minute).

The pressure drop versus soot loading curves for the inventive and comparative examples are shown in FIG. 1. It is evident that the unique pore microstructures of the inventive bodies enable a much lower rate of pressure drop increase with increasing soot loading than the comparative examples.

Figure 2:
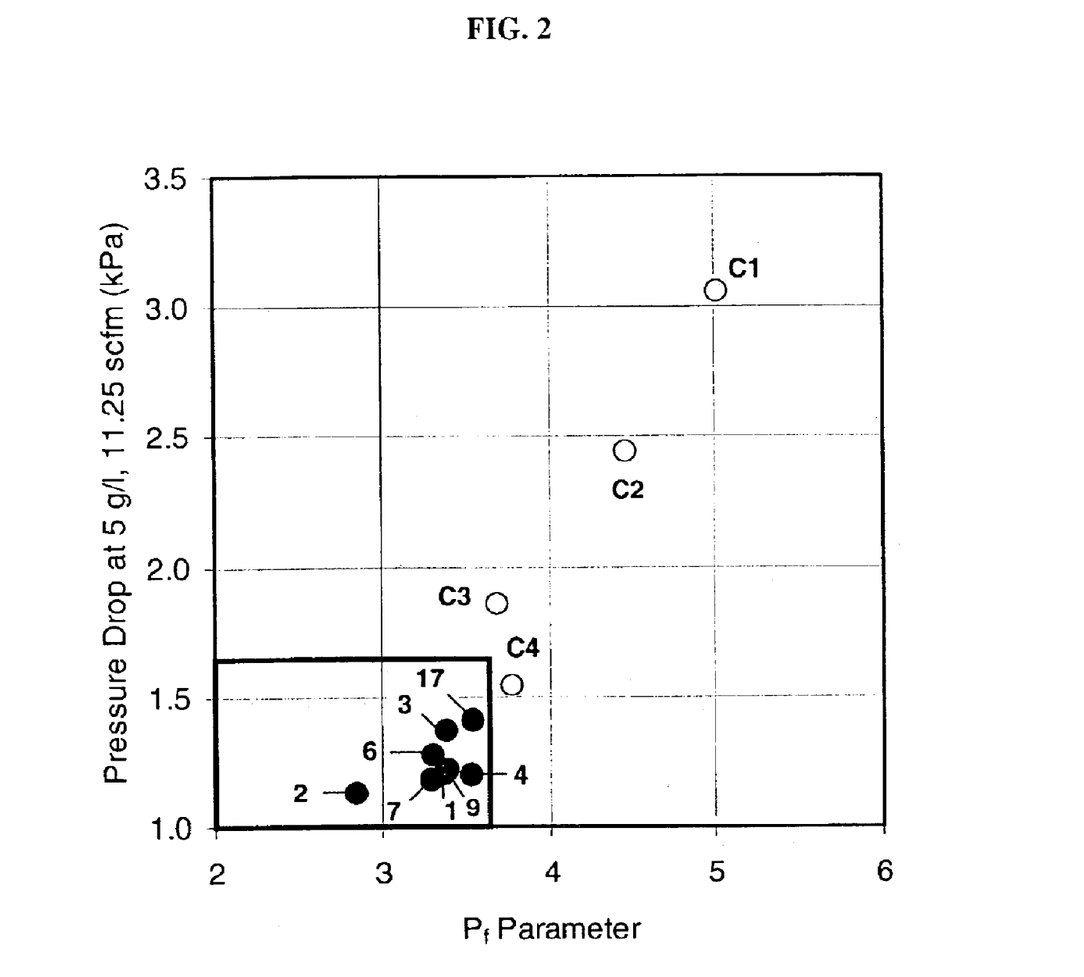
FIG. 2 illustrates the pressure drop through the filter (kPa) at 5 g/l soot loading and an air flow rate of 11.25 scfm as a function of the porosity factor, $P_f$, for a set of comparative and inventive examples according to the present invention.

The pressure drops at 5 g/l soot loading and 11.25 scfm flow rate are plotted versus the porosity factor, $P_f$, in FIG. 2. It is further evident that when the quantity $P_f$ is less than 3.65, the soot-loaded pressure drops are of a very low value.

The four-point modulus of rupture, a measure of flexural strength on a bar in which the channels are oriented parallel to the length of the bar, has been measured on many of the inventive and comparative examples. The results are reported in Tables 2 to 5. It is evident that the strengths of the inventive examples are much higher than those of the comparative examples when compared at a given level of porosity.

The filtration efficiencies of the filters, based upon a numerical count of artificial soot particles entering and exiting the filters, have been measured on some comparative and inventive examples. The results are shown in Tables 2 and 3. It is seen that the inventive examples possess the highest filtration efficiencies.

It should be understood that while the present invention has been described in detail with respect to certain illustrative and specific embodiments thereof, it should not be considered limited to such but may be used in other ways without departing from the spirit of the invention and the scope of the appended claims.

TABLE 1

| Raw Material | Median Particle Diameter as Measured by Laser Diffraction (μm) | Specific Surface Area (m$^2$/g) |
|---|---|---|
| Talc A | 21 | 2.2 |
| Talc B | 69 | — |

TABLE 1-continued

| Raw Material | Median Particle Diameter as Measured by Laser Diffraction (μm) | Specific Surface Area (m²/g) |
|---|---|---|
| Talc C | 4.9 | 9.3 |
| Alumina A | 6.8 | 0.9 |
| Alumina B | 1.8 | 2.1 |
| Alumina C | 0.6 | — |
| Aluminum Hydroxide | 5.0 | — |
| Dispersible Boehmite | — | — |
| Kaolin | 3.2 | 14.2 |
| Silica A | 23 | 0.8 |
| Silica B | 3.7 | — |
| Graphite A | 124 | 1.9 |
| Graphite B | 49 | — |
| Graphite C | 36 | — |
| Graphite D (spherical) | 29 | — |
| Graphite E | 9 | — |
| Potato Starch | 45 | — |

TABLE 2

| | Example Number | | | | | | |
|---|---|---|---|---|---|---|---|
| | C1 | C2 | C3 | C4 | C5 | C6 | C7 |
| Talc A | 40.70 | — | 40.70 | — | — | — | — |
| Talc B | — | 40.70 | — | 40.70 | — | — | — |
| Talc C | — | — | — | — | 39.96 | 39.96 | 39.96 |
| Alumina A | — | — | — | — | 21.54 | 21.54 | — |
| Alumina B | 14.80 | 14.80 | 14.80 | 14.80 | — | — | — |
| Alumina C | — | — | — | — | — | — | 21.54 |
| Aluminum Hydroxide | 16.00 | 16.00 | 16.00 | 16.00 | 16.35 | 16.35 | 16.35 |
| Kaolin | 16.00 | 16.00 | 16.00 | 16.00 | — | — | — |
| Silica A | 12.50 | 12.50 | 12.50 | 12.50 | 22.15 | 22.15 | 22.15 |
| Silica B | — | — | — | — | — | — | — |
| Graphite A | 20.00 | 20.00 | 60.00 | 60.00 | 40.00 | — | — |
| Graphite C | — | — | — | — | — | — | 25.00 |
| Potato Starch | — | — | — | — | — | — | — |
| Cell Density (in$^{-2}$) | 182 | 178 | 184 | 182 | — | — | — |
| Web Thickness (10$^{-3}$ in) | 10.9 | 11.8 | 11.8 | 11.7 | — | — | — |
| Diameter (cm) | 5.08 | 5.07 | 5.07 | 5.07 | — | — | — |
| Length (cm) | 16.07 | 15.17 | 16.02 | 15.19 | — | — | — |
| Total Intrusion (ml/g) | 0.3877 | 0.3978 | 0.5854 | 0.6526 | 0.6084 | 0.3799 | 0.4460 |
| % Porosity | 46.6 | 47.31 | 61.3 | 60.2 | 62.0 | 48.0 | 54.2 |
| $d_{10}$ pore size | 2.05 | 12.4 | 4.14 | 10.6 | 5.9 | 3.5 | 2.7 |
| $d_{50}$ pore size | 11.1 | 33.5 | 13.9 | 29.2 | 19.3 | 7.0 | 6.7 |
| $d_{90}$ pore size | 31.2 | 80.8 | 37.5 | 71.40 | 41.6 | 21.5 | 17.7 |
| $(d_{90}-d_{10})/d_{50}$ | 2.63 | 2.04 | 2.40 | 2.08 | 1.85 | 2.57 | 2.24 |
| $(d_{90}-d_{50})/d_{50}$ | 1.81 | 1.41 | 1.70 | 1.45 | 1.16 | 2.07 | 1.64 |
| $(d_{50}-d_{10})/d_{50}$ | 0.82 | 0.63 | 0.70 | 0.64 | 0.69 | 0.51 | 0.60 |
| $P_f$ parameter | 5.02 | 4.47 | 3.69 | 3.78 | 3.79 | 4.10 | 3.70 |
| % of total porosity ≥ 50 μm | — | — | — | — | 7.3 | — | — |
| % of total porosity ≤ 10 μm | — | — | — | — | 21.8 | — | — |
| Clean pressure drop at 11.25 scfm (kPa) | 0.52 | 0.34 | 0.39 | 0.32 | — | — | — |
| Pressure drop at 1 g/L, 11.25 scfm (kPa) | 2.13 | 1.14 | 1.07 | 0.68 | — | — | — |
| Pressure drop at 5 g/L, 11.25 scfm (kPa) | 3.06 | 2.44 | 1.86 | 1.54 | — | — | — |
| Clean pressure drop at 26.25 scfm (kPa) | 1.69 | 1.32 | 1.43 | 1.28 | — | — | — |
| Pressure drop at 1 g/L, 26.25 scfm (kPa) | 5.49 | 3.04 | 2.96 | 2.01 | — | — | — |
| Pressure drop at 5 g/L, 26.25 scfm (kPa) | 7.84 | 6.81 | 4.93 | 4.28 | — | — | — |
| CTE, 25–800° C. (10$^{-7}$ ° C.$^{-1}$) | 3.5 | 6.3 | 5.6 | 7.3 | 6.2 | 2.5 | 2.2 |
| Filtration Efficiency (%) | 97.7 | 87.2 | 96.8 | 38.9 | — | — | — |
| 4-Point MOR (psi) | 294 | 265 | 162 | 138 | — | — | — |

TABLE 3

| | Example Number | | | | |
|---|---|---|---|---|---|
| | 1 | 2 | 3 | 4 | 5 |
| Talc A | — | — | — | — | — |
| Talc B | — | — | — | — | — |
| Talc C | 39.96 | 39.96 | 39.96 | 39.96 | 39.96 |
| Alumina A | 21.54 | 21.54 | 21.54 | 21.54 | 21.54 |

TABLE 3-continued

| | Example Number | | | | |
|---|---|---|---|---|---|
| | 1 | 2 | 3 | 4 | 5 |
| Alumina B | — | — | — | — | — |
| Aluminum Hydroxide | 16.35 | 16.35 | 16.35 | 16.35 | 16.35 |
| Kaolin | — | — | — | — | — |
| Silica A | 22.15 | — | 22.15 | — | — |
| Silica B | — | 22.15 | — | 22.15 | 22.15 |
| Graphite A | — | — | — | — | 40.00 |
| Graphite C | 40.00 | 40.00 | — | — | — |
| Potato Starch | — | — | 25.00 | 25.00 | — |
| Cell Density (in$^{-2}$) | 186 | 182 | 189 | 186 | — |
| Web Thickness (10$^{-3}$ in) | 12.0 | 11.5 | 11.6 | 11.7 | — |
| Diameter (cm) | 5.17 | 5.13 | 5.12 | 5.16 | — |
| Length (cm) | 15.37 | 16.09 | 15.59 | 15.56 | — |
| Total Intrusion (ml/g) | 0.6433 | 0.7066 | 0.6042 | 0.6000 | 0.7455 |
| % Porosity | 59.7 | 62.51 | 61.6 | 56.4 | 63.9 |
| $d_{10}$ pore size | 3.59 | 5.51 | 8.73 | 8.94 | 5.7 |
| $d_{50}$ pore size | 8.63 | 9.69 | 17.4 | 15.7 | 13.2 |
| $d_{90}$ pore size | 22.9 | 16.35 | 32.8 | 37.7 | 31.8 |
| $(d_{90}-d_{10})/d_{50}$ | 2.24 | 1.12 | 1.38 | 1.83 | 1.98 |
| $(d_{90}-d_{50})/d_{50}$ | 1.65 | 0.69 | 0.89 | 1.40 | 1.41 |
| $(d_{50}-d_{10})/d_{50}$ | 0.58 | 0.43 | 0.50 | 0.43 | 0.57 |
| $P_f$ parameter | 3.37 | 2.85 | 3.38 | 3.53 | 3.31 |
| % of total porosity ≧ 50 μm | 4.6 | 5.0 | 5.5 | 6.4 | 5.3 |
| % of total porosity ≦ 10 μm | 59.8 | 55.3 | 13.3 | 12.9 | 36.2 |
| Clean Pressure Drop at 11.25 scfm (kPa) | 0.40 | 0.39 | 0.36 | 0.34 | — |
| Pressure drop at 1 g/L, 11.25 scfm (kPa) | 0.71 | 0.61 | 0.70 | 0.61 | — |
| Pressure drop at 5 g/L, 11.25 scfm (kPa) | 1.21 | 1.13 | 1.37 | 1.20 | — |
| Clean Pressure Drop at 26.25 scfm (kPa) | 1.35 | 1.32 | 1.33 | 1.23 | — |
| Pressure drop at 1 g/L, 26.25 scfm (kPa) | 2.05 | 1.82 | 2.09 | 1.83 | — |
| Pressure drop at 5 g/L, 26.25 scfm (kPa) | 3.29 | 3.10 | 3.73 | 3.30 | — |
| CTE, 25–800° C. (10$^{-7}$ ° C.$^{-1}$) | 6.2 | 8.1 | 7.8 | 6.4 | 7.6 |
| Filtration Efficiency (%) | 98.8 | 98.9 | 98.6 | 99.1 | — |
| 4-Point MOR (psi) | 296 | 338 | 288 | 238 | — |

TABLE 4

| | Example Number | | | | |
|---|---|---|---|---|---|
| | 6 | 7 | 8 | 9 | 10 |
| Talc A | — | — | — | — | — |
| Talc B | — | — | — | — | — |
| Talc C | 39.96 | 39.96 | 39.96 | 40.70 | 39.86 |
| Alumina A | 21.54 | — | — | 14.80 | 19.05 |
| Alumina B | — | 21.54 | 21.54 | — | — |
| Aluminum Hydroxide | 16.35 | 16.35 | 16.35 | 16.00 | 14.01 |
| Dispersible Boehmite | — | — | — | — | 4.99 |
| Kaolin | — | — | — | 16.00 | — |
| Silica A | 22.15 | 22.15 | — | 12.50 | 22.09 |
| Silica B | — | — | 22.15 | — | — |
| Graphite A | — | — | — | — | — |
| Graphite C | 25.00 | 40.00 | 40.00 | 40.00 | 40.00 |
| Potato Starch | — | — | — | — | — |
| Cell Density (in$^{-2}$) | 181 | 179 | — | 183 | — |
| Web Thickness (10$^{-3}$ in) | 12.4 | 13.6 | — | 12.5 | — |
| Diameter (cm) | 5.07 | 5.13 | — | 5.10 | — |
| Length (cm) | 16.2 | 15.23 | — | 15.20 | — |
| Total Intrusion (ml/g) | 0.5563 | 0.6352 | 0.6479 | 0.5269 | 0.6430 |
| % Porosity | 59.1 | 58.4 | 60.8 | 56.0 | 61.4 |
| $d_{10}$ pore size | 6.8 | 6.5 | 5.5 | 4.7 | 6.7 |
| $d_{50}$ pore size | 12.5 | 12.2 | 9.7 | 9.1 | 12.4 |
| $d_{90}$ pore size | 29.1 | 25.6 | 14.4 | 22.2 | 27.6 |
| $(d_{90}-d_{10})/d_{50}$ | 1.78 | 1.57 | 0.91 | 1.92 | 1.69 |
| $(d_{90}-d_{50})/d_{50}$ | 1.32 | 1.10 | 0.48 | 1.44 | 1.23 |
| $(d_{50}-d_{10})/d_{50}$ | 0.46 | 0.47 | 0.43 | 0.49 | 0.46 |
| $P_f$ parameter | 3.30 | 3.29 | 2.88 | 3.39 | 3.17 |
| % of total porosity ≧ 50 μm | — | — | — | — | — |
| % of total porosity ≦ 10 μm | — | — | — | — | — |
| Clean Pressure Drop at 11.25 scfm (kPa) | 0.44 | 0.39 | — | 0.45 | — |
| Pressure drop at 1 g/L, 11.25 scfm (kPa) | 0.76 | 0.64 | — | 0.77 | — |
| Pressure drop at 5 g/L, 11.25 scfm (kPa) | 1.28 | 1.18 | — | 1.22 | — |
| Clean Pressure Drop at 26.25 scfm (kPa) | 1.42 | 1.34 | — | 1.49 | — |
| Pressure drop at 1 g/L, 26.25 scfm (kPa) | 2.15 | 1.94 | — | 2.18 | — |

TABLE 4-continued

|  | Example Number | | | | |
|---|---|---|---|---|---|
|  | 6 | 7 | 8 | 9 | 10 |
| Pressure drop at 5 g/L, 26.25 scfm (kPa) | 3.39 | 3.27 | — | 3.28 | — |
| CTE, 25–800° C. ($10^{-7}$ ° C.$^{-1}$) | 7.2 | 5.5 | 8.2 | 8.8 | 4.8 |
| Filtration Efficiency (%) | — | — | — | — | — |
| 4-Point MOR (psi) | 404 | — | — | 353 | — |

TABLE 5

|  | Example Number | | | | | | |
|---|---|---|---|---|---|---|---|
|  | 11 | 12 | 13 | 14 | 15 | 16 | 17 |
| Talc A | — | — | — | — | — | — | — |
| Talc B | — | — | — | — | — | — | — |
| Talc C | 39.96 | 39.96 | 39.96 | 40.70 | 39.96 | 40.70 | 39.86 |
| Alumina A | 21.54 | 21.54 | 21.54 | — | 21.54 | — | 19.05 |
| Alumina B | — | — | — | 14.80 | — | 14.80 | — |
| Aluminum Hydroxide | 16.35 | 16.35 | 16.35 | 16.00 | 16.35 | 16.00 | 14.01 |
| Dispersible Boehmite | — | — | — | — | — | — | 4.99 |
| Kaolin | — | — | — | 16.00 | — | 16.00 | — |
| Silica A | 22.15 | 22.15 | 22.15 | 12.50 | 22.15 | 12.50 | 22.09 |
| Silica B | — | — | — | — | — | — | — |
| Graphite A | — | — | — | — | — | — | — |
| Graphite B | — | — | — | — | 40.00 | 40.00 | — |
| Graphite C | — | — | — | — | — | — | 30.00 |
| Graphite D | 25.00 | 40.00 | — | — | — | — | — |
| Graphite E | — | — | 40.00 | 40.00 | — | — | — |
| Cell Density (in$^{-2}$) | — | — | — | — | — | — | 192 |
| Web Thickness ($10^{-3}$ in) | — | — | — | — | — | — | 13.8 |
| Diameter (cm) | — | — | — | — | — | — | 5.08 |
| Length (cm) | — | — | — | — | — | — | 15.45 |
| Total Intrusion (ml/g) | 0.5053 | 0.5801 | 0.6118 | 0.6004 | 0.5466 | 0.5556 | 0.5030 |
| % Porosity | 54.7 | 61.3 | 61.3 | 60.0 | 59.7 | 58.1 | 54.3 |
| $d_{10}$ pore size | 5.7 | 7.4 | 6.4 | 4.1 | 7.0 | 3.6 | 5.1 |
| $d_{50}$ pore size | 12.1 | 13.8 | 12.1 | 7.0 | 14.6 | 8.7 | 10.4 |
| $d_{90}$ pore size | 24.7 | 26.8 | 35.4 | 21.1 | 32.4 | 17.3 | 23.5 |
| $(d_{90}-d_{10})/d_{50}$ | 1.58 | 1.41 | 2.39 | 2.44 | 1.74 | 1.58 | 1.76 |
| $(d_{90}-d_{50})/d_{50}$ | 1.04 | 0.94 | 1.91 | 2.03 | 1.22 | 0.99 | 1.25 |
| $(d_{50}-d_{10})/d_{50}$ | 0.53 | 0.47 | 0.47 | 0.41 | 0.52 | 0.59 | 0.51 |
| $P_f$ parameter | 3.57 | 3.19 | 3.28 | 3.12 | 3.43 | 3.35 | 3.54 |
| % of total porosity $\geq$ 50 μm | — | — | — | — | — | — | — |
| % of total porosity $\leq$ 10 μm | — | — | — | — | — | — | — |
| Clean Pressure Drop at 11.25 scfm (kPa) | — | — | — | — | — | — | 0.42 |
| Pressure drop at 1 g/L, 11.25 scfm (kPa) | — | — | — | — | — | — | 0.76 |
| Pressure drop at 5 g/L, 11.25 scfm (kPa) | — | — | — | — | — | — | 1.41 |
| Clean Pressure Drop at 26.25 scfm (kPa) | — | — | — | — | — | — | 1.51 |
| Pressure drop at 1 g/L, 26.25 scfm (kPa) | — | — | — | — | — | — | 2.25 |
| Pressure drop at 5 g/L, 26.25 scfm (kPa) | — | — | — | — | — | — | 3.85 |
| CTE, 25–800° C. ($10^{-7}$ ° C.$^{-1}$) | 5.1 | 5.9 | — | — | — | — | 4.3 |
| Filtration Efficiency (%) | — | — | — | — | — | — | — |
| 4-Point MOR (psi) | — | — | — | — | — | — | 356 |

What is claimed:

1. A cordierite ceramic body having (i) a pore size distribution and a porosity which satisfy the relationship $10.2474/[(d_{50})^2(\text{pore fraction})]+0.0366183(d_{90})-0.00040119(d_{90})^2+0.468815(1/\text{pore fraction})^2+0.0297715(d_{50})+1.61639(d_{50}-d_{10})/d_{50} \leq 3.65$, and (ii) a CTE (25°–800° C.) of $\leq 15 \times 10^{-7}/°$ C., wherein the cordierite body meets one of the following two conditions: (i) the porosity is at least 43 and less than 50% or (ii) more than 15% of the porosity is finer than 10 micrometers, wherein the cordierite ceramic body is produced from a moldable mixture comprising cordierite-forming raw materials including (a) a fine talc having a median particle diameter, as measured by laser diffraction, of less than 10 micrometers, and a B.E.T. specific surface area of greater than 5 m²/g, and (b) a pore former.

2. A cordierite ceramic body according to claim 1 wherein the relationship $10.2474/[(d_{50})^2(\text{pore fraction})]+0.0366183(d_{90})-0.00040119(d_{90})^2+0.468815(1/\text{pore fraction})^2+0.0297715(d_{50})+1.61639(d_{50}-d_{10})/d_{50}$ is $\leq 3.3$.

3. A cordierite ceramic body according to claim 2 wherein the relationship $10.2474/[(d_{50})^2(\text{pore fraction})]+0.0366183(d_{90})-0.00040119(d_{90})^2+0.468815(1/\text{pore fraction})^2+0.0297715(d_{50})+1.61639(d_{50}-d_{10})/d_{50}$ is $\leq 3.0$.

4. A cordierite ceramic body according to claim 1 wherein $d_{50}$, defined as the median pore diameter, is between 3 and 25 micrometers.

5. A cordierite ceramic body according to claim 4 wherein $d_{50}$ is between 5 and 20 micrometers.

6. A cordierite ceramic body according to claim 5 wherein $d_{50}$ is between 7 and 12 micrometers.

7. A cordierite ceramic body according to claim 1 wherein the function $(d_{50}-d_{10})/d_{50}$ is less than 0.70.

8. A cordierite ceramic body according to claim 7 wherein the function $(d_{50}-d_{10})/d_{50}$ is less than 0.60.

9. A cordierite ceramic body according to claim 8 wherein the function $(d_{50}-d_{10})/d_{50}$ is less than 0.55.

10. A cordierite ceramic body according to claim 9 wherein the function $(d_{50}-d_{10})/d_{50}$ is less than 0.50.

11. A cordierite ceramic body according to claim 10 wherein the function $(d_{50}-d_{10})/d_{50}$ is less than 0.45.

12. A cordierite ceramic body according to claim 1 wherein the CTE (25°–800° C.) is $\leq 10\times 10^{-7}/°$ C.

13. A cordierite ceramic body according to claim 12 wherein the CTE (25°–800° C.) is $\leq 7\times 10^{-7}/°$ C.

14. A cordierite ceramic body according to claim 1 having application in diesel exhaust filtration.

* * * * *